US010992683B2

(12) United States Patent
Yaacoby et al.

(10) Patent No.: US 10,992,683 B2
(45) Date of Patent: *Apr. 27, 2021

(54) SYSTEM AND METHOD FOR AUTHENTICATING, STORING, RETRIEVING, AND VERIFYING DOCUMENTS

(71) Applicant: Wymsical, Inc., Greenwich, CT (US)

(72) Inventors: Eli Yaacoby, Greenwich, CT (US); Liwen Yaacoby, Greenwich, CT (US)

(73) Assignee: Wymsical, Inc., Greenwich, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/432,787

(22) Filed: Jun. 5, 2019

(65) Prior Publication Data

US 2019/0356670 A1    Nov. 21, 2019

Related U.S. Application Data

(63) Continuation of application No. 15/171,246, filed on Jun. 2, 2016, now Pat. No. 10,341,353.
(Continued)

(51) Int. Cl.
*H04L 29/06* (2006.01)
*G06F 21/62* (2013.01)
(Continued)

(52) U.S. Cl.
CPC ............ *H04L 63/102* (2013.01); *G06F 16/93* (2019.01); *G06F 21/36* (2013.01);
(Continued)

(58) Field of Classification Search
CPC . H04L 63/102; H04L 63/083; H04L 63/0428; G06F 21/36; G06F 16/93; G06F 21/6218
See application file for complete search history.

(56) References Cited

U.S. PATENT DOCUMENTS

| 5,426,700 A | 6/1995 | Berson |
| 5,615,268 A | 3/1997 | Bisbee et al. |

(Continued)

OTHER PUBLICATIONS

PBSecure; http://www.pitneybowes.com/in/shipping-and-mailing/security/pbsecure.html.
(Continued)

*Primary Examiner* — Jung W Kim
*Assistant Examiner* — Thomas Ho
(74) *Attorney, Agent, or Firm* — UConn IP Law Clinic; Julie Ludwig (57) ABSTRACT

Disclosed herein is a method for electronic authentication, validation, storage, and third party verification of documents by a document service. The method provides a system for authenticating a user by a process that includes presentation of photo identification by the user and generation of an authenticated user code. The user then requests transfer of a document to the document service. The document service then validates, encrypts, and stores the document and associated metadata. A request for verification by a third party is responded to by the document service if the user sends the authenticated user code to confirm permission for verification by the document service.

20 Claims, 10 Drawing Sheets

Related U.S. Application Data (60) Provisional application No. 62/170,943, filed on Jun. 4, 2015.

(51) Int. Cl.
   *G06F 16/93* (2019.01)
   *G06F 21/36* (2013.01)

(52) U.S. Cl.
   CPC ...... *G06F 21/6218* (2013.01); *H04L 63/0428* (2013.01); *H04L 63/083* (2013.01)

(56) References Cited

U.S. PATENT DOCUMENTS

| | | | |
|---|---|---|---|
| 6,178,510 B1* | 1/2001 | O'Connor | G06Q 20/02 726/5 |
| 6,515,988 B1* | 2/2003 | Eldridge | G06F 15/0225 370/389 |
| 6,732,090 B2* | 5/2004 | Shanahan | G06F 16/38 |
| 6,944,770 B2 | 9/2005 | Henderson et al. | |
| 7,359,881 B2* | 4/2008 | Stefik | G06Q 10/101 705/51 |
| 7,826,076 B2* | 11/2010 | Manchala | H04L 63/08 358/1.14 |
| 8,341,141 B2 | 12/2012 | Krislov | |
| 9,948,630 B2* | 4/2018 | Moran | H04L 63/083 |
| 2002/0083008 A1* | 6/2002 | Smith | G06Q 20/4014 705/64 |
| 2003/0154406 A1* | 8/2003 | Honarvar | G06Q 20/4014 726/10 |
| 2005/0149450 A1* | 7/2005 | Stefik | H04L 12/1403 705/58 |
| 2007/0061881 A1* | 3/2007 | Eyre | G06Q 30/02 726/21 |
| 2007/0136600 A1 | 6/2007 | Wilkinson et al. | |
| 2009/0320095 A1* | 12/2009 | Nanda | G06F 21/33 726/2 |
| 2011/0047629 A1* | 2/2011 | Mitchell | H04L 67/22 726/28 |
| 2012/0096342 A1* | 4/2012 | Wang | G06F 16/93 715/234 |
| 2012/0331108 A1 | 12/2012 | Ferdowsi | |
| 2013/0262333 A1* | 10/2013 | Wicker | G06Q 50/265 705/325 |
| 2014/0258123 A1* | 9/2014 | Fernandes | G06Q 20/401 705/44 |
| 2014/0279825 A1* | 9/2014 | Shukla | G06F 16/93 707/601 |
| 2015/0177938 A1* | 6/2015 | Kleinpeter | H04L 41/22 715/738 |
| 2016/0005036 A1* | 1/2016 | Tervo | G06Q 20/367 705/65 |
| 2017/0116588 A1* | 4/2017 | Conant | G06Q 20/3552 |

OTHER PUBLICATIONS

Myeasydocs.com; https://www.myeasydocs.com/myeasydocs_new/ws_pages/index_new.aspx.
Lockyourdocs.com; https://www.lockyourdocs.com/index.html.
Vaultworthy.com; https://www.vaultworthy.com/.
lsac.org; https://www.lsac.org/applying-law-school/cas.
finaid.org; http://www.finaid.org/fafsa/irsdataretrievaltool.phtml.

* cited by examiner

SYSTEM AND METHOD FOR AUTHENTICATING, STORING, RETRIEVING, AND VERIFYING DOCUMENTS

CROSS-REFERENCE TO RELATED APPLICATIONS

This application depends from and claims priority to U.S. Provisional Application No. 62/170,943 filed Jun. 4, 2015, by Eli Yaacoby and Liwen Yaacoby, entitled "System and Method for Authenticating, Storing, Retrieving, and Verifying Documents", and U.S. application Ser. No. 15/171,246 filed Jun. 2, 2016, the entire contents of which are incorporated herein by reference.

FIELD OF THE INVENTION

The present invention relates generally to document authenticating, storing, retrieving, and verification systems and methods.

BACKGROUND OF THE INVENTION

The present disclosure generally relates to a system, method and process to authenticate, store, retrieve, and verify documents belonging to an entity.

Throughout history and even more so today the ability to replicate and forge documents creates significant problems in transactions requiring, for example, documentary proof of identity, financial records, employment history, or citizenship. Transactions depend on the ability to authenticate and verify these important documents. Today, individuals, companies, universities, agencies and various other entities are troubled when solely relying on physical documents such as a passport or birth certificate to confirm an identity or other information represented by the document. Additionally, as systems that used to require one to deliver a copy or an original of a document to complete a process such as securing a loan or applying to college move to complete electronic based filing systems the need to authenticate documents in various and changing forms is rapidly growing.

A person seeking, for example, a loan may be required to provide proof of income documents, banks account status, forms of identification, and employment verification documents. In some cases, a person would need to provide such documents with a seal of authenticity from the issuing agency. This may require a person to request the same document many times and even provide updated versions from time to time as information changes. The bank or mortgage agency, in the case of securing a loan, needs to allocate time, personnel, and money in order to properly and securely authenticate the one or more documents involved in each transaction. In addition to these processes being costly and time consuming for the third party, they also open themselves up to the mishandling of documents and exposure of personal information to numerous personnel during the transaction process.

To increase security and improve document authentication efficiency computer systems and processes for encrypting and storing documents have been contemplated. Throughout history, various encryption/decryption schemes have been developed that, at least for a time were thought to be secure only to discover that the security was able to be compromised as encryption/decryption keys were passed from one system to another. Consequently, there is a need to centralize the storage, authentication and verification of documents to improve security and efficiency of authenticating documents. Thus, there is a need for systems and methods that overcome the above and other disadvantages.

SUMMARY OF THE INVENTION

The invention relates to a method for authentication, validation, storage, and third party verification of a user's documents, comprises authenticating a user, where authentication requires the user to register with a document service, and providing to the document service personal information of the user, in exchange for which the user receives an unauthenticated code, which the user then presents in person with a photo identification to an ID station associated with the document service which uploads the unauthenticated code and photo identification at the document service and associates it with the user's personal information, the document service then generating a validation code and sending it to the user for presentation to the ID station, whereby presentation of the validation code to the ID station causes the document service to generate an authenticated user code, the authenticated user code then being sent to the user; associating a document with the authenticated user code; transferring the document associated with the authenticated user code from a document source to an electronic vault owned by the document service when requested by the user; verifying the document by receipt of the authenticated user code with the document source, or by independent data; encrypting and securely storing the document so that control of sending or viewing the document remains with the user; storing metadata and encryption data associated with the document at the document service; having the document service verify the authentication of the document in response to a request by a third party and confirm that the document is valid, by the user sending the authenticated user code to the document service, the document service sending a hyperlink to the third party, and upon the third party clicking on the hyperlink permission is requested from the user for the document service to allow the document or metadata for the document to be viewed by the third party, and upon receiving permission from the owner, the document or metadata is viewable by the third party.

In addition, the invention relates to a method for authentication, validation, storage, and third party verification of a user's documents comprises authenticating a user, where authentication requires the user to register with a document service, and providing to the document service personal information of the user, in exchange for which the user receives an unauthenticated code, which the user then presents in person with a photo identification to an ID station associated with the document service which uploads the unauthenticated code and photo identification at the document service and associates it with the user's personal information, the document service then generating a validation code and sending it to the user for presentation to the ID station, whereby presentation of the validation code to the ID station causes the document service to generate an authenticated user code, the authenticated user code then being sent to the user; associating a document with the authenticated user code; transferring the document associated with the authenticated user code from a document source to an electronic vault owned by the document service when requested by the user; verifying the document by receipt of the authenticated user code, with the document source, or by independent data; encrypting and securely storing the document so that control of sending or viewing the document remains with the user; and storing metadata and encryption data associated with the document at the document service.

The invention also relates to a method for authentication, validation, storage, and third party verification of a user's documents comprises a document source provides a document to a document service; a user registers for a user vault account with a document service, wherein the user provides an ID station authority with one or more picture IDs and an email address, and the document service provides the user with a validation code when the ID station authority uploads the one or more picture IDs to the document service; the document service creates a user vault account when the validation code is entered by the ID station authority; the document service encrypts and stores the document in the user vault account; the document source provides the user with an authentic document code; a third party requests verification of a document stored with the documentation service, wherein the third provides the authentic document code provided by a user to the document service; the document service retrieves the document requested for verification; the document service decrypts the document; the document service determines whether the user needs to approve third party access to the document requested for verification; and the document service provides document access to the third party.

A further embodiment is a computer-implemented method for authentication, validation, storage, and third party verification of a user's documents, the computer-implemented method comprising authenticating, by a first computer, a user, wherein authentication requires the user to register with a document service using a computer network, and to provide to the document service personal information of the user, in exchange for which the user receives an unauthenticated code, which the user then presents with a photo identification to an ID station associated with the document service which uploads, by the first computer or a second computer, the unauthenticated code and photo identification at the document service and associates them with the user's personal information, the document service then generating a computerized validation code and sending, by the computer network, the validation code to the user for presentation to the ID station, whereby presentation of the validation code to the ID station causes the document service to generate an authenticated user code, the authenticated user code then being sent to the user. The method also comprises associating a document with the authenticated user code; transferring, by a third computer, a digital document associated with the authenticated user code from a document source to an electronic vault for the user when requested by the user, wherein the digital document comprises a digital version of the document associated with the authenticated user code; and verifying, by the second computer, the document by receipt of the authenticated user code with the document source, or by independent data. The method also includes encrypting and securely storing the digital document so that control of sending or viewing the digital document remains with the user; storing metadata and encryption data associated with the document at the document service; and having the document service verify the authentication of the digital document in response to a request by a third party and confirm that the digital document is valid, by the user sending, by the network, the authenticated user code to the document service, the document service sending a computerized hyperlink to the third party, and upon the third party clicking on the computerized hyperlink permission is requested from the user for the document service to allow the digital document or metadata for the document to be viewed by the third party, and upon receiving, by the network, permission from the owner, the digital document or metadata is viewable by the third party.

Another embodiment is a computer-implemented method for authentication, validation, storage, and third party verification of a user's documents, the computer-implemented method comprising authenticating, by a first computer, a user, wherein authentication requires the user to register with a document service using a computer network, and to provide to the document service personal information of the user, in exchange for which the user receives an unauthenticated code, which the user then presents with a photo identification to an ID station associated with the document service which uploads, by the first computer or a second computer, the unauthenticated code and photo identification at the document service and associates them with the user's personal information, the document service then generating a computerized validation code and sending, by the computer network, the validation code to the user for presentation to the ID station, whereby presentation of the validation code to the ID station causes the document service to generate an authenticated user code, the authenticated user code then being sent to the user. The method also includes associating a document with the authenticated user code; transferring, by a third computer, a digital document associated with the authenticated user code from a document source to an electronic vault for the user when requested by the user, wherein the digital document comprises a digital version of the document associated with the authenticated user code; verifying, by the second computer, the document by receipt of the authenticated user code with the document source, or by independent data; encrypting and securely storing the digital document so that control of sending or viewing the digital document remains with the user; and storing metadata and encryption data associated with the document at the document service.

BRIEF DESCRIPTION OF THE DRAWINGS

Referring now to the figures, which are exemplary embodiments, and wherein the like elements are numbered alike.

DETAILED DESCRIPTION OF EMBODIMENTS OF THE INVENTION

The following description of particular embodiment(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

It should be noted that the terms "first," "second," and "third," and the like may be used herein to modify elements performing similar and/or analogous functions. These modifiers do not imply a spatial, sequential, or hierarchical order to the modified elements unless specifically stated.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

A system and method for authenticating, storing, retrieving and verifying documents is provided.

Figure 1:
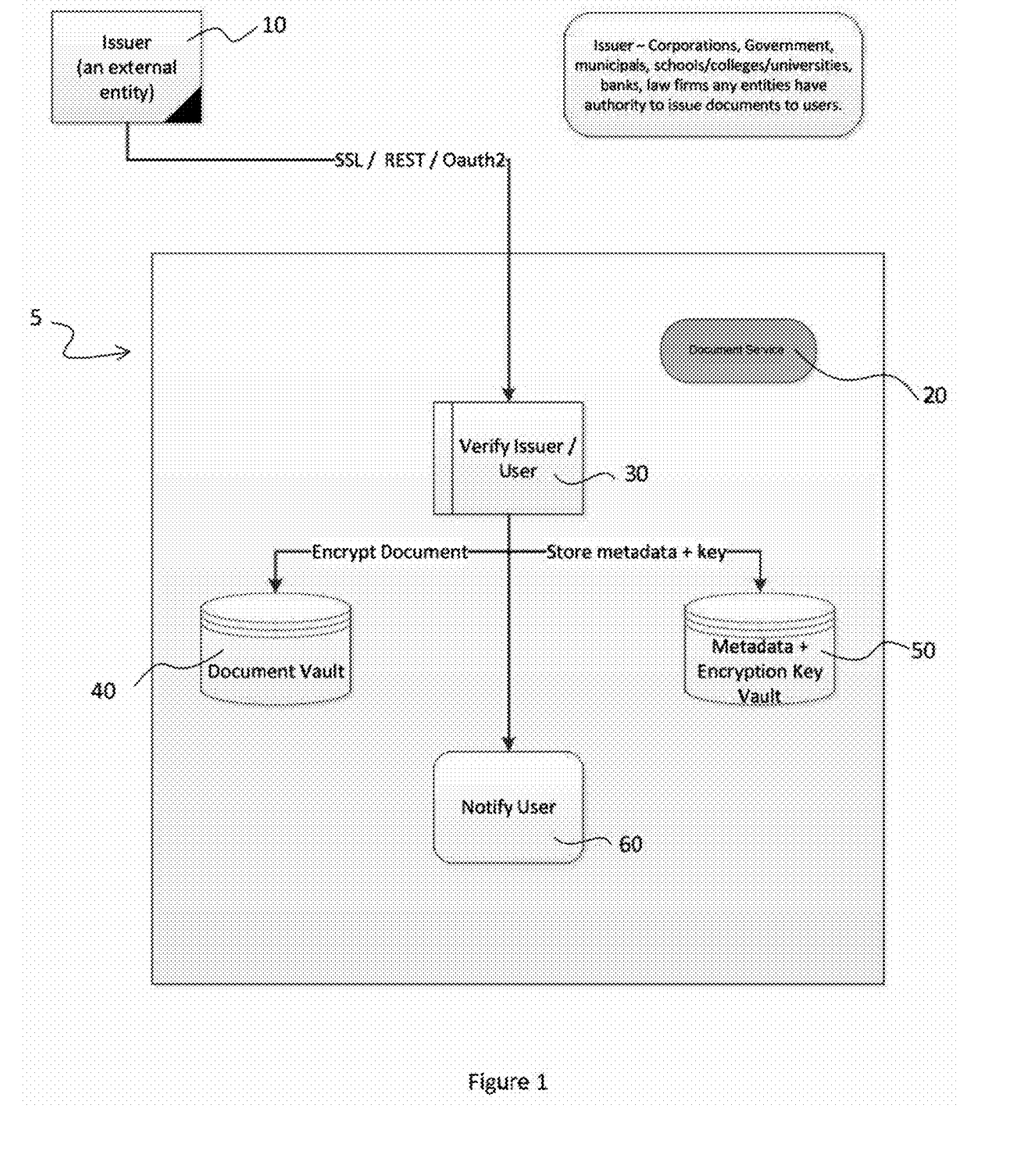
FIG. 1 is a schematic view of one embodiment of the disclosed system.

FIG. 1 is a schematic view of one embodiment of the disclosed system 5. An issuer 10 is in communication with a document service 20. The document service may refer to any entity that provides the authenticating, storing, retrieving, and verifying document service to the user. Whenever "document service" is used in this patent application, it shall include any entity that provides or may provide authenticating, storing, retrieving, and verifying document service to the user, as well as any other entity that provides the listed services. The issuer 10 is generally any originator, creator, preparer, or other entity that may produce a document of import such as, but not limited to a college transcript, insurance policy, driver's license, passport, etc. Issuers may include, but are not limited to corporations, governments, municipalities, schools, colleges, universities, banks, law firms, and any entities, which have authority to issue documents to users. An issuer in some instances may also be the user. At act 30, the document service 20 verifies that the issuer 10 is a legitimate party and further verifies that the user is also a legitimate party, and further verifies any documents issued by an issuer that the user has requested the document service to verify and store. At act 40, the document service 20 encrypts and stores a digital document in a document vault 41. At act 50 the document service 20 stores metadata about the document, user, and issuer, and other relevant information in a metadata and encryption key vault. In addition, at act 50, the document service 20 stores an encryption for the document in the metadata and encryption key vault. At act 60, the user is notified that the document has been authenticated, verified, stored, and is ready for retrieval.

Figure 2:
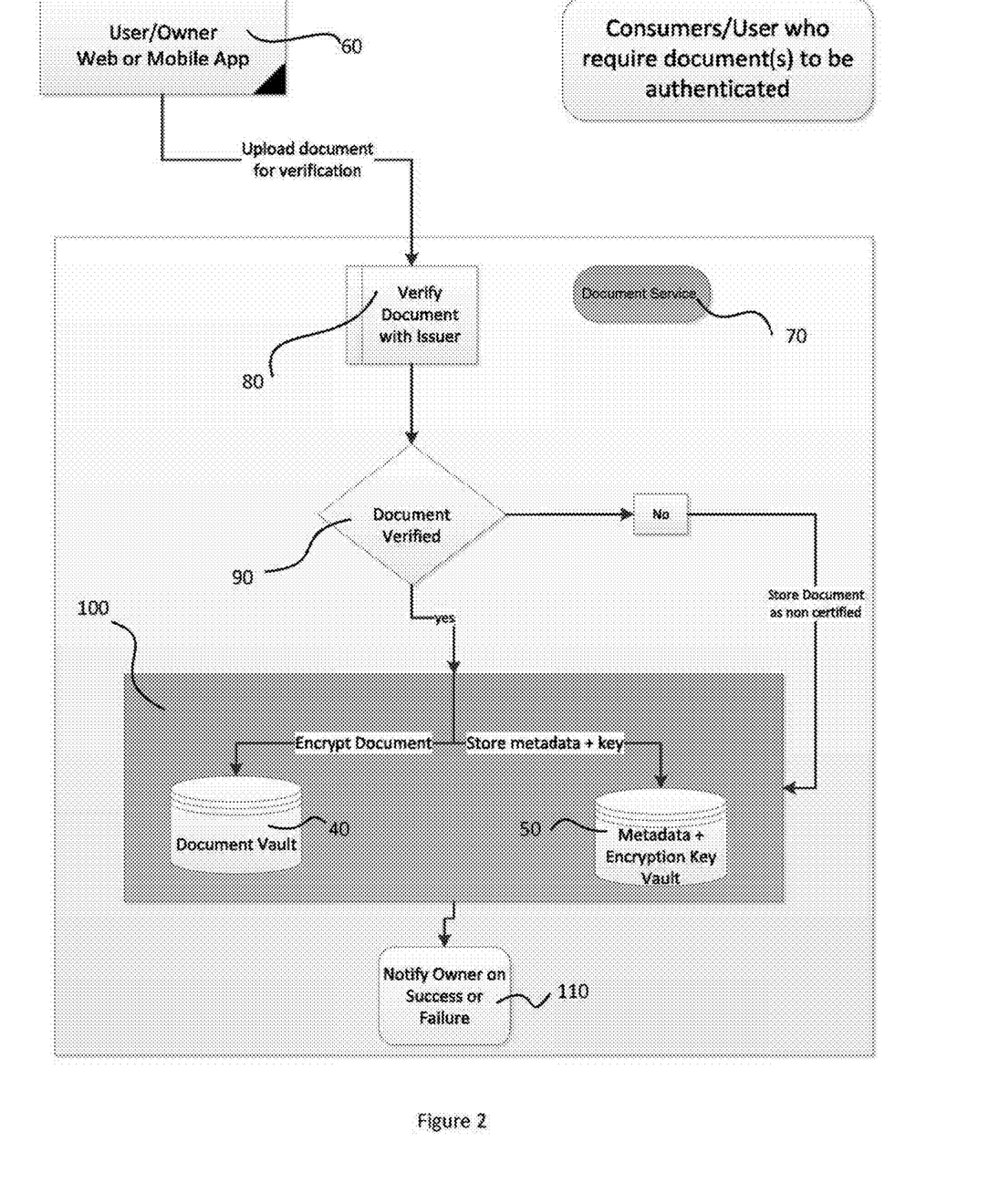
FIG. 2 is a schematic view of one embodiment showing how a user may communicate with the document service.

FIG. 2 is a schematic view of one embodiment showing how a user may communicate with the document service 70. A user 60 communicates with the document service 70 via a network, such as the internet ("web") or mobile app. The user may upload a document for verification to the document service 70. Once the document service 70 receives the document, the document service 70 verifies the document with the issuer at act 80. Act 80 may include the document service 70 having pre-arranged relationships set up with various issuers to streamline the verification step, for example the document service 70 may have access to databases maintained by issuer and be able to verify the document by accessing the database, or by making queries through the internet to the issuer, and/or the document service 70 may communicate directly with issuer to verify the document. At query 90, the document service 70 determines whether the document is verified. If not verified, the document may be encrypted and stored, at act 100, as a non-certified document in the document vault. Further, at act 100, metadata about the non-certified document, user, issuer, and other relevant information may be stored in the metadata and encryption key vault. Still at act 100, the encryption key for the non-certified document may be stored in the metadata and encryption key vault. If verified at query 90, then the verified document may be encrypted and stored at act 100 in the document vault. In addition, at act 100, metadata about the document, user, issuer, and other relevant information may be stored in the metadata and encryption key vault. Further, at act 100, the encryption key for the document may be stored in the metadata and encryption key vault. The document service, at act 110, notifies the owner of a successful storage of an encrypted document or a failure thus only a storage of a non-certified document.

Figure 3:
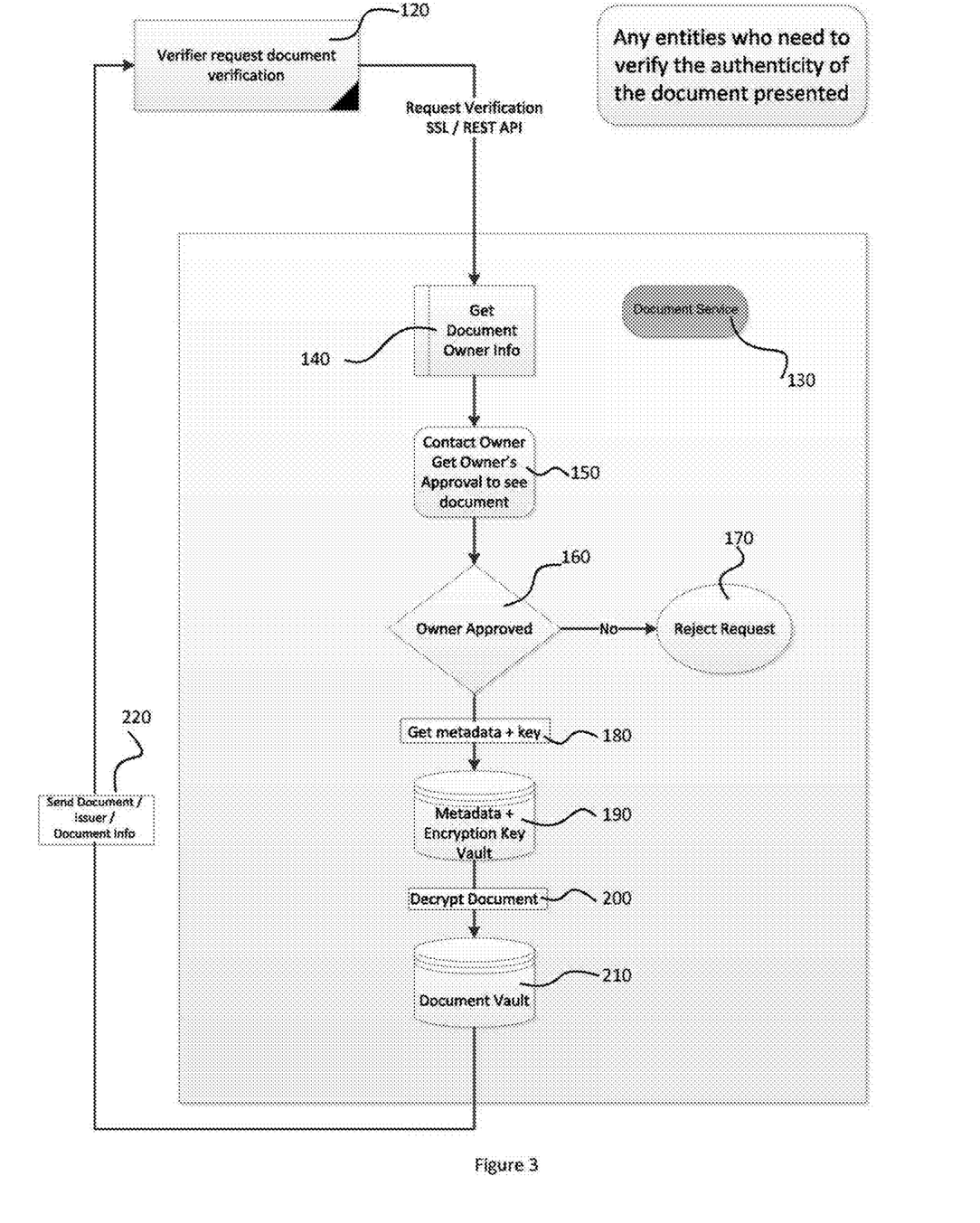
FIG. 3 is a schematic diagram showing how a verifier is able to get verification of documents.

FIG. 3 is a schematic diagram showing how a verifier is able to get verification of documents. At act 120, a verifier requests document verification from the document service 130. At act 140, the document service 130 obtains document owner information. At act 150, the document service 130 contacts the document owner, and seeks to obtain approval from owner to allow verification of the document and to allow viewing of the document. At query 160, if the owner does not approve, then the verification request is rejected at 170. If the owner does approve, then at act 180 the metadata and encryption key for the document is retrieved by the document service 130 from the metadata and encryption key vault 190. At act 200, the document is retrieved from document vault 210 and decrypted, and is sent to the verifier as a verified document.

Figure 4:
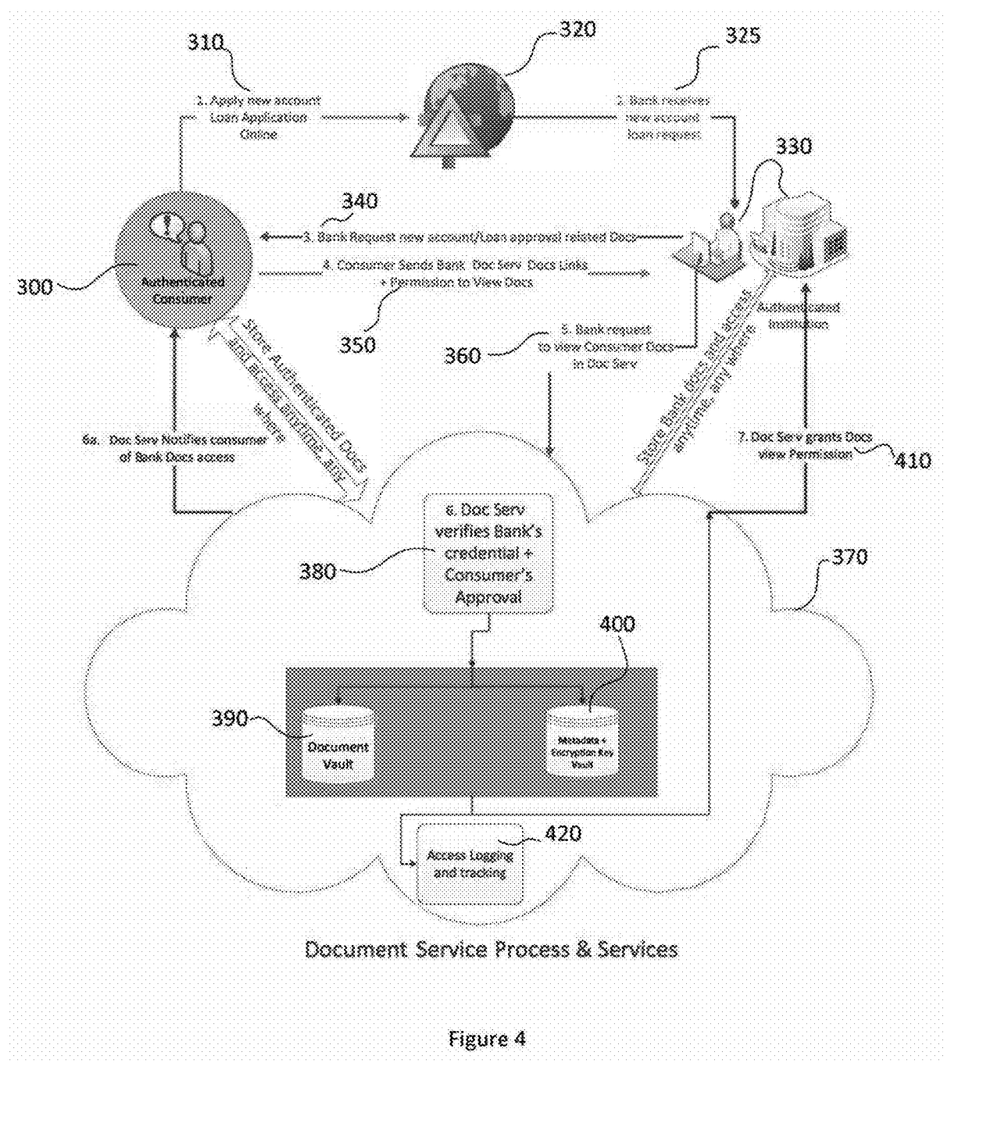
FIG. 4 is a schematic diagram showing an embodiment of the disclosed system when used for a new account/loan application.

FIG. 4 is a schematic diagram showing an embodiment of the disclosed system when used for a new account/loan application. Of course, one of ordinary skill in the art will recognize that the disclosed system and method for authenticating, storing, retrieving, and verifying documents can be used in many other applications, such as, but not limited to: a verifier (e.g., a government representative) verifying the identification card of an owner, a verifier verifying current insurance of an owner, an educational institution verifying a transcript of an owner, or other entities needing to verify a document of an owner. An authenticated user 300, also may be referred to as an owner or user, is shown applying for a new account and/or loan online via an internet 320 at act 310. The verifier 330 (the bank in this example) receives the new account and loan request at act 325. At act 340, the bank requests new account and loan approval documents from the owner 300. At act 350, the consumer sends the bank 330 the document service documents links and permission to view documents. At act 360, the verifier (bank) 330 requests to view the documents from the document service 370. At act 380, the document service 370 verifies the verifier's credentials, and obtains the owner's approval to make the documents available to the verifier 330. Once owner's approval is received by the document service 370, the document service 370 accesses the document vault 390 and metadata and encryption key vault 400, in order to provide document access to the verifier 330 at act 410. The document service 370 will log and track access information of all documents at act 420.

Figure 5:
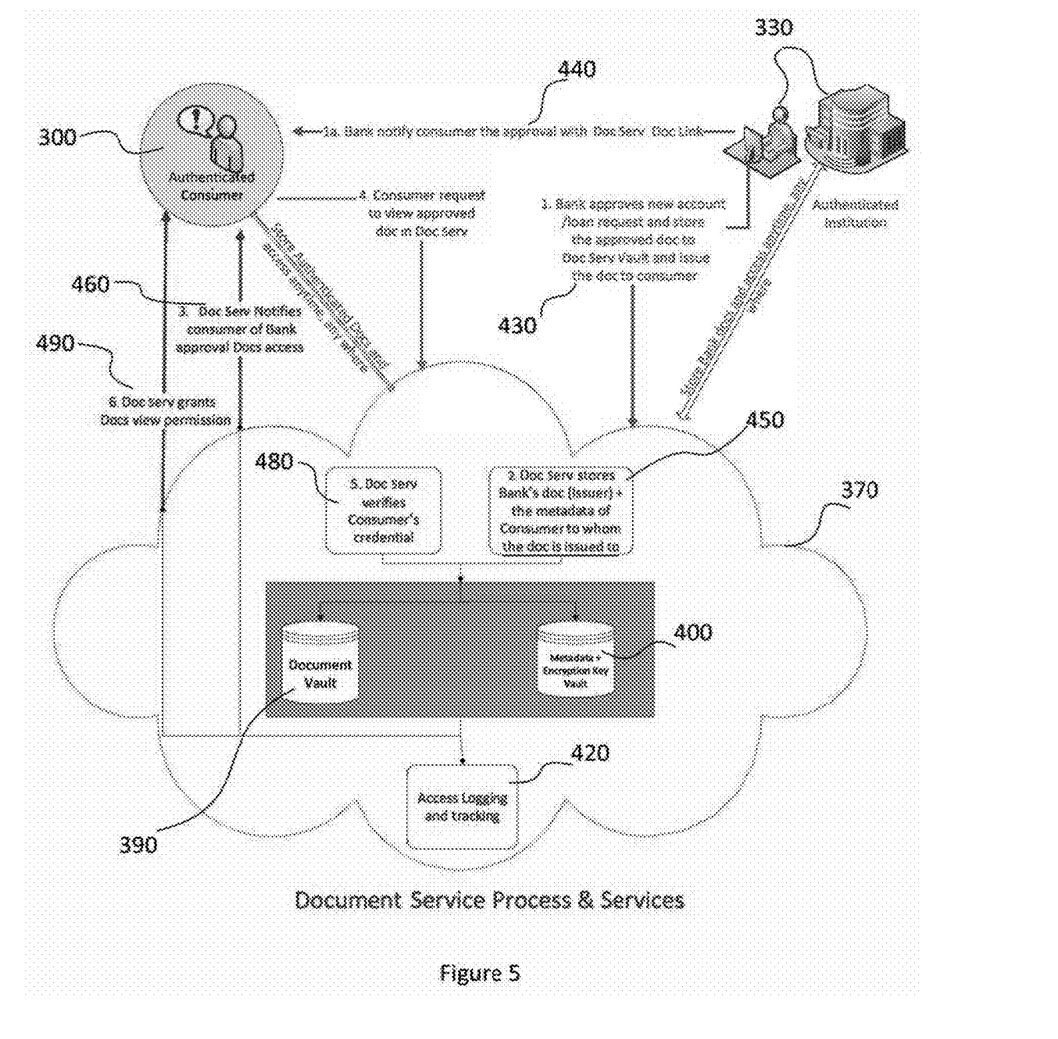
FIG. 5 is a schematic diagram that continues from FIG. 4.

FIG. 5 is a schematic diagram that may continue from FIG. 4. At act 430, the bank approves the new account and loan request, stores the approval document to the document service Vault 390, and issues the document to the owner (consumer) 300. In this example the once verifier (i.e. bank) has now become an issuer of new documents to the owner. At act 440, the verifier 330 (bank) notifies the owner 300 (consumer) that the loan was approved by sending a link to the approval document. At act 450, the document service 370 stores the verifier's (bank) approval document and metadata of owner (consumer) 300 to whom the approval document is issued to, in the document vault 390 and the metadata and encryption key vault 400. At act 460, the document service 370 notifies the owner (consumer) 300 that access is now available to the issuer's/bank's approval documents. At act 470, the consumer 300 requests viewing of the approval document, the document being located in the document service network. At act 480, the document service 370 verifies the consumer's credentials before allowing the consumer to view the bank approval documents. At act 490, the document service 370 grants the owner (consumer) 300 permission to view the approval documents.

Figure 6A:
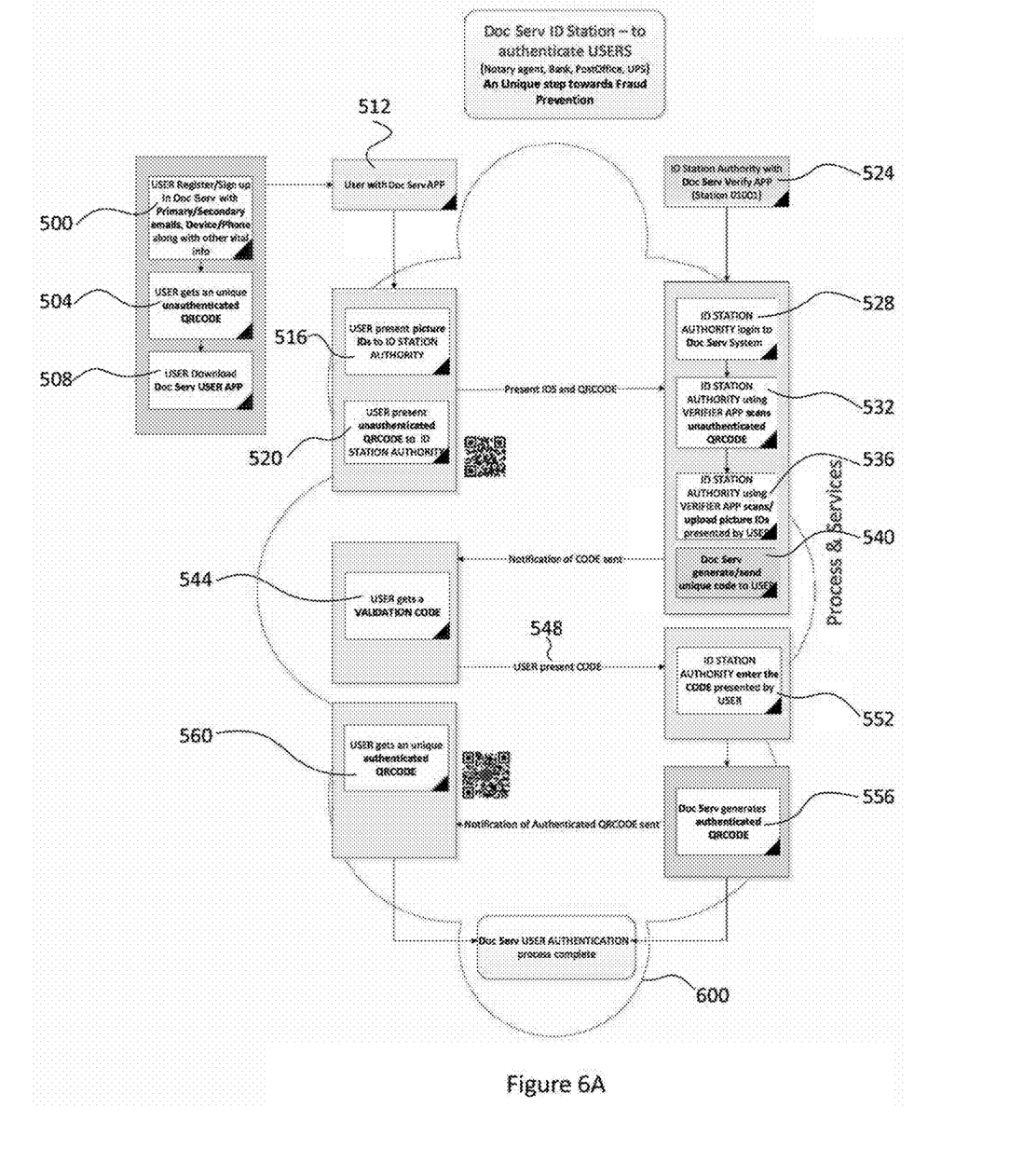
FIG. 6A is a schematic diagram showing the document service ID station system.

FIG. 6A is a schematic diagram showing the document service ID station system. At act 500, the user registers and signs up with the document service 600, by providing the user's information, such as Primary/Secondary emails, Device ID/Phone Number, along with other information. At act 504, the user obtains a unique unauthenticated code, for example a QRcode, from the document service 600. At act 508, the user may download a document service user application (app) on a user computer 509, such as a smart device. User now has the app on his smart device at act 512. At act 516, the user presents a picture ID to an ID station authority. At act 520, the user presents the unauthenticated QRcode to the ID station authority, optionally via his smart device and using the document service app. At act 524, the ID station authority verifies that the user downloaded the document service app. At act 528, the ID station authority logs into the document service network using an ID station computer 529. At act 532, the ID station authority using a verifier app scans the unauthenticated QRcode presented by the user. At act 536, the ID station authority scans and uploads one or more picture IDs presented by the user on the ID station computer 529, by using the verifier app. At act 540, the document service 600 generates and sends a unique code validation code to the user using a document service computer 541. At act 544, the user receives the validation code from the document service 600. The user presents the code to the ID station authority at act 548. At act 552, the ID station authority enters the code presented by the user into the document service computer 541 in the document service system. At act 556, the document service generates an authenticated QRcode. At act 560, the user receives the authenticated QRcode from the document service 600.

Figure 6B:
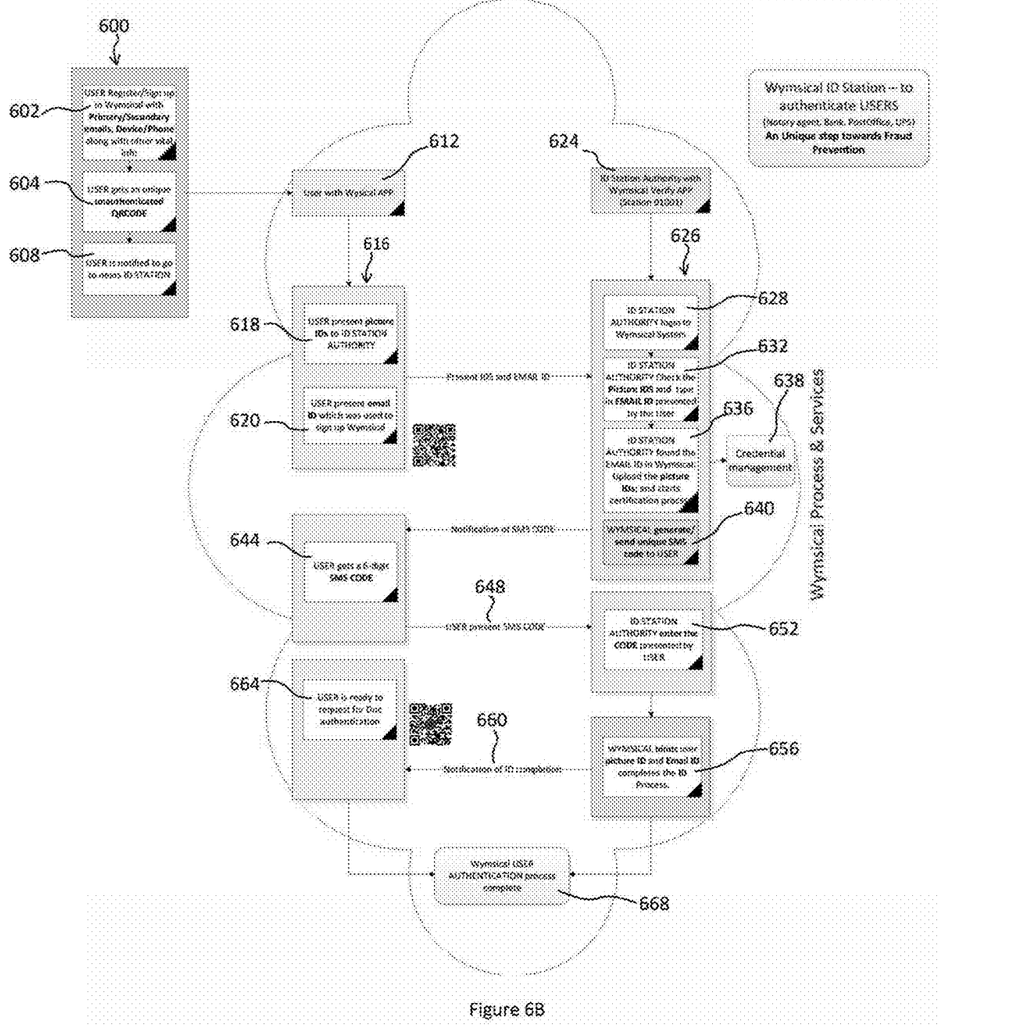
FIG. 6B is an exemplary user authentication process between a user, an ID station authority and a document service.

FIG. 6B depicts an exemplary user authentication process between a user, an ID station authority and a document service. This process may be completed through an application based on a device, phone, computer system or other implementation apparatus that is known to one skilled in the art. Similarly, this process may be completed in part on a network-connected device and in part in person at a physical location such as an ID station authority. In an embodiment, a document service and ID station authority may include Wymsical™ products and services. According to the authentication process in FIG. 6B, a user initiates registration with Wymsical™, as depicted in act 600. During the registration process, a user, at act 602, provides Wymsical™ with registration information comprising a primary email, a secondary email, device information, a phone number or other vital information required to establish themselves as a user and to create a Wymsical™ vault account. At act 604, Wymsical™ provides the user a unique unauthenticated QRcode. Additionally, Wymsical™ provides the user with a notification to proceed to an ID station authority. An ID station authority may include a physical location such as a notary agent, bank, post office, ups or other designated locations. An ID station may also include an online-based location.

Equipped with the Wymsical™ APP 612, a user may initiate communication with an ID station authority, act 616. A user may present one or more picture IDs to an ID station authority, act 618. The Wymsical™ system may require one or more forms of picture ID to complete the user authentication process. The user may also, at act 616, provide an email address, act 620, used during registration 600. Equipped with the Wymsical™ Verify APP 624, the ID station authority accesses the Wymsical™ system, act 628. At act 632, the ID station authority checks the information provided by the user, which may include the provided picture ID and email address with the Wymsical™ system. Wymsical™ systems may include or be interconnected with a credential management system 638 for checking picture IDs, email addresses, and other registration information to authenticate the user. Once the ID station authority finds the email address and optionally other registration information in the Wymsical™ system, act 636, a certification process is initiated. Wymsical™ generates and sends a unique SMS code to the user, at act 640. The user receives the unique SMS code, at act 644, and presents the unique SMS code to the ID station authority at act 648. The ID station authority enters the presented unique SMS code at act 652, and when valid Wymsical™ binds the picture IDs and email address, and optionally other user registration information, at act 656 to complete the user authentication at act 668. Wymsical™ also may send the user a notification 660 that ID confirmation is complete. Completion of the ID authentication permits the user to begin document acceptance and authentication 664 into a user vault. A vault may be a database. In other embodiments, the vault may be a combination of meta data fields that describe the document, the issuer, and/or the owner. The document blob may include meta data and encryption information that help the decryption of the document.

Figure 7:
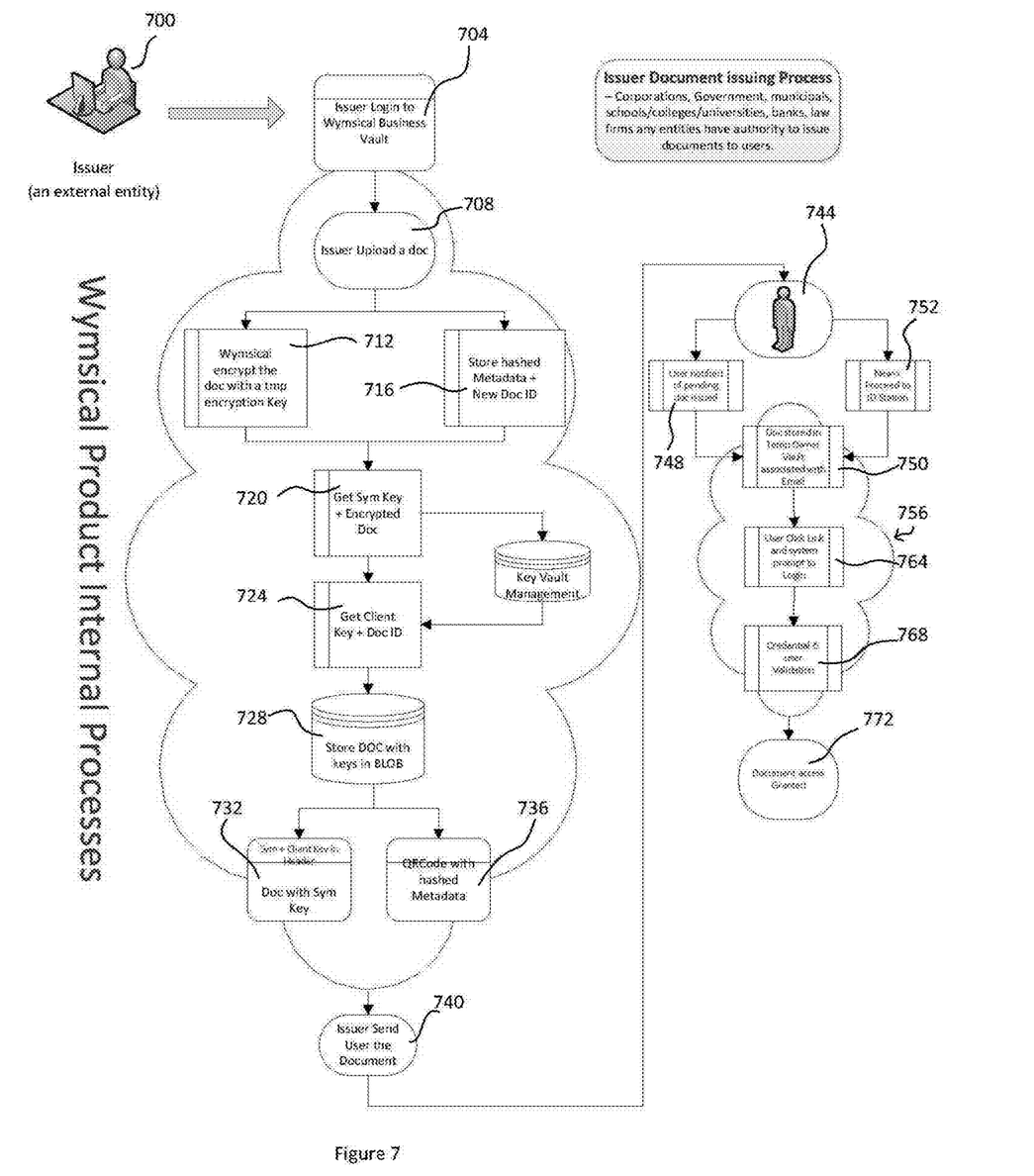
FIG. 7 is an exemplary Wymsical™ system process depicting the issuance of a document from an issuer to a user and into a user's Wymsical™ vault account.

In a further embodiment, referring to FIG. 7, an exemplary Wymsical™ system includes a process for an issuer to issue a document to a user and a user's Wymsical™ vault account. To accomplish this an issuer 700 logs into Wymsical™ Business Vault 704. The issuer selects a document to upload and uploads the document at act 708 to the Wymsical™ system using a document source computer 709. The Wymsical™ system preforms at least two tasks on an uploaded document. At act 712, the Wymsical™ system encrypts the document with a temporary encryption key. Additionally, at act 716, the Wymsical™ system stores hashed metadata and a new document ID. At act 720, the symmetric-key, "Sym Key" and the encrypted document are retrieved. At act 724, the Client Key and document key are retrieved. The keys may be managed in a key management vault 722. The document, Sym Key and Client Key are stored as a binary large object, "BLOB," at act 728. Upon completion of a document upload to the Wymsical™ system, the uploaded document is stored with the Sym Key including the Sym Key and Client Key in the header at act 732 along with an authenticated document code including the hashed metadata, such as a QRcode at act 736.

The issuer 700 may now send the document to the user 744, act 740. Depending on whether the user 744 is a registered Wymsical™ system user, a user may be prompted to enter the acceptance process of the document into their established document vault, act 748 or be prompted to become an authenticated user at act 752. An embodiment of the authentication process may include the process referred to in FIG. 6B and subsequently similarly described. Once a user is authenticated, they may begin accepting documents into their Wymsical™ Vault Account. However, should the user 744 already have an authenticated Wymsical™ Vault Account they may proceed with document acceptance 756. An issued document pending user acceptance is stored in a temporary owner vault associated with an email address, act 750. The user may optionally click a link provided by the document service, which will prompt their login, act 764. At act 768, the user's credentials are validated. Once validated the document is granted access into the user's Wymsical™ Vault, at act 772.

Figure 8:
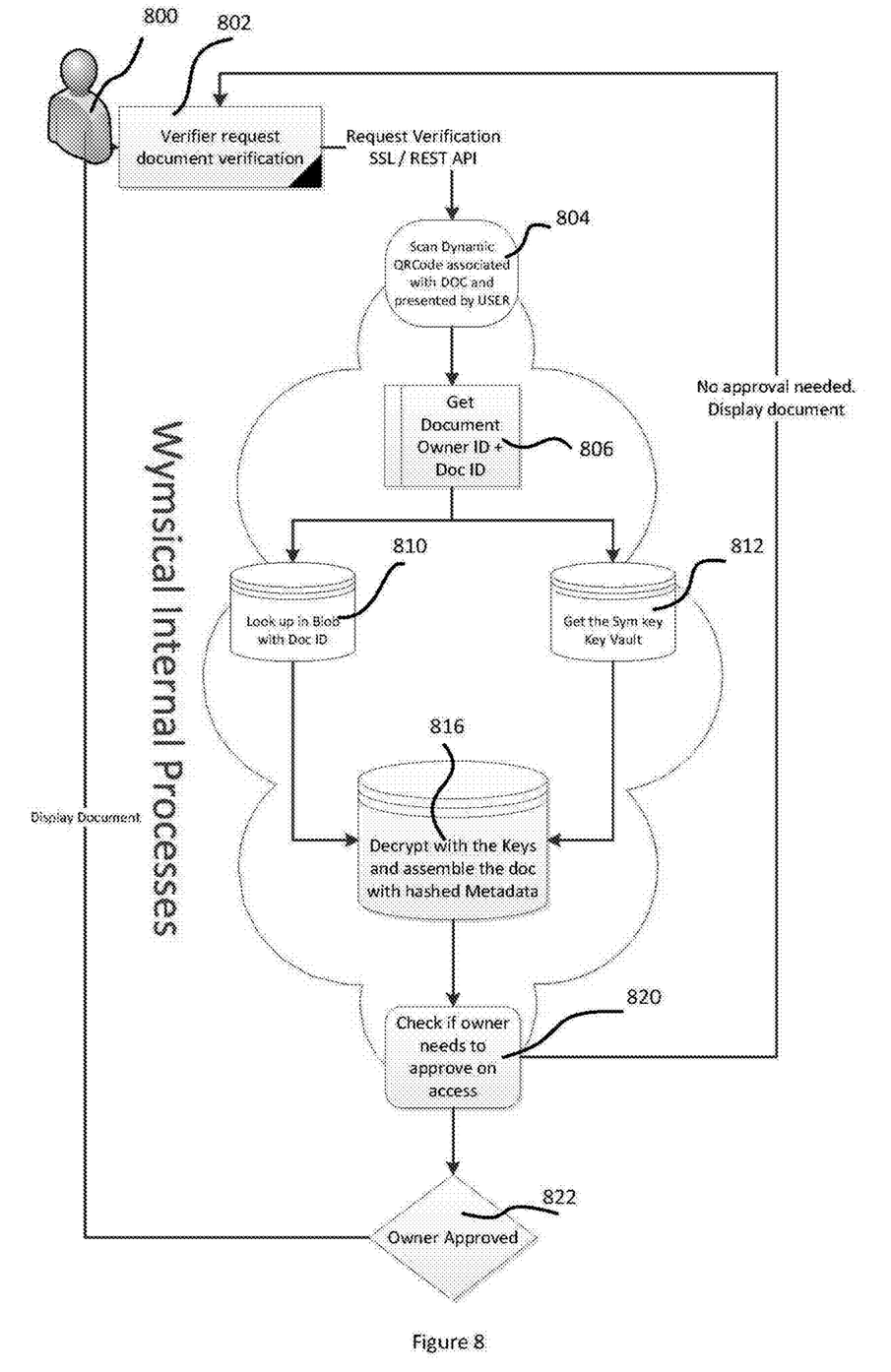
FIG. 8 is an exemplary process implemented in the Wymsical™ system for providing verification of a document of a user to a verifier.
Figure 9:
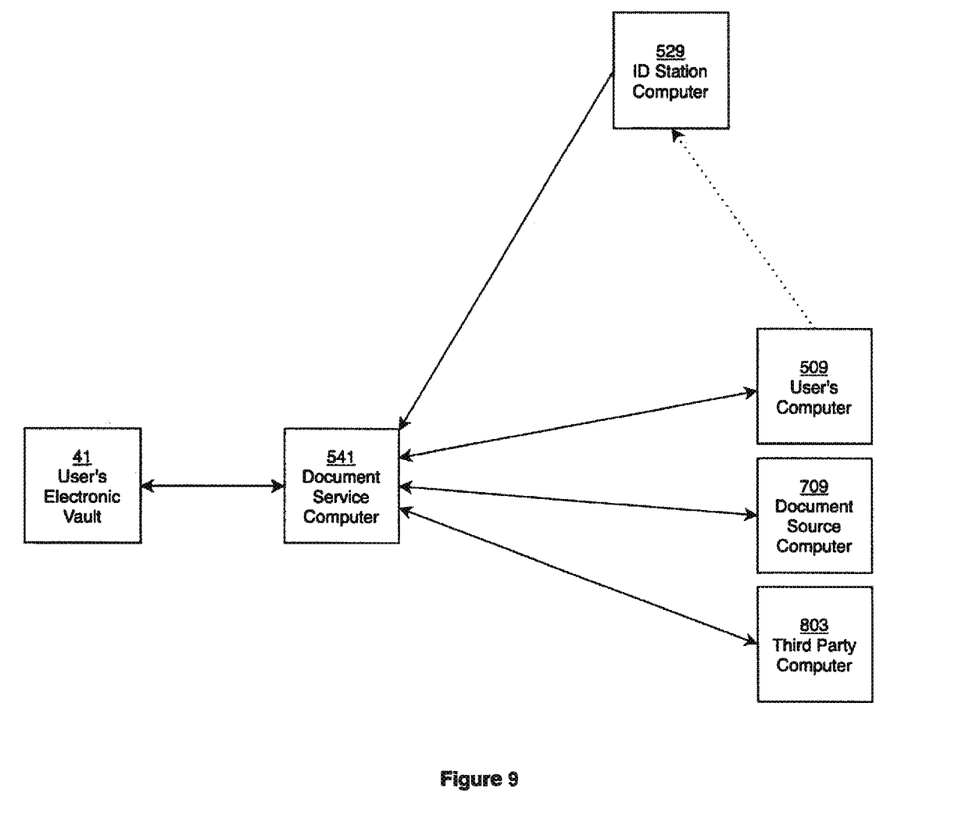
FIG. 9 is an exemplary system depicting computers and an electronic vault described herein.

In yet another embodiment of the Wymsical™ system, referring now to FIG. 8, a verifier 800 may request verification of a document of a user. FIG. 8 depicts an exemplary process implemented in the Wymsical™ system for providing verification of a document of a user to a verifier. Act 802, a verifier 800 may request verification of a document. In embodiments, the verifier 800 uses a third party computer 803. In an embodiment, at act 804, a verifier may scan a dynamic QRcode associated to a particular document presented by a user. The dynamic QRcode is an example of an authenticated document code a user may provide to a verifier when the verifier is seeking verification of authenticity and validity of a document. The scanning of the dynamic QRcode triggers act 806 the retrieval of the document, owner ID and document ID. In response to requesting a verification either by scanning the dynamic QRcode or another method of request, the Wymsical™ system or document service may send a link, such as a hyperlink, to the requesting verifier. This link may directly provide access to viewing the document upon completion of the Wymsical™ system or document service retrieval process. Alternatively, the link may require the verifier to log into the Wymsical™ system or document service before providing the requested verification. Furthermore, the Wymsical™ system or document service may request a verifier provide an approval code from an owner or require the verifier wait until the owner has completed an independent authorization allowing the verifier access to the document stored with the Wymsical™ system or document service.

When a verifier makes a request, the Wymsical™ system at act 810 locates the document ID in BLOB and at act 812 retrieves the Sym Key from the Key Vault. With the Keys, the document is decrypted and the document is assembled with the hashed metadata, at act 816. At act 820, the Wymsical™ system checks whether the owner needs to approve access. If owner approval for access is required, the owner is notified and upon approval, the document is displayed to the verifier 800 through act 822. In an embodiment where the owner does not need to provide approval, the document is displayed to the verifier 800. This document verification process is for any entity who needs to verify the authenticity of a document presented.

In several embodiments, QRcodes are exemplary. A QRcode may be replaced with a bar code, numerical code, alphanumeric code, or other machine-readable code known in the art capable of enciphering data. Similarly, authenticated user codes or authenticated document codes disclosed herein may include, but are not limited to, a QRcode, bar code, numerical code, alphanumeric code, or other machine-readable code.

Included in many of the embodiments, a user, issuer, and verifier connect to the Wymsical™ system or similar document service. To maintain a secure transmission of information these connections may be completed using secure sockets layer, "SSL," to establish an encrypted link between the Wymsical™ system or similar document service and the user, issuer, or verifier. Without an SSL connection, any man in the middle can decode authorization codes from the header information passed over the connection. This is mainly because basic authentications in standard HTTP header use base 64. Additionally, other standards for authentication may be used independently or in conjunction with SSL to pass authentication information. Some other standards for authentication may include, Oauth, Oauth2, REST API, or other standards known to one skilled in the art.

The disclosed system can authenticate, store, retrieve and verify essential personal documents anytime, anywhere via either Web or Mobile. The disclosed system can provide the user with a virtual vault of authenticated documents.

For any business, the disclosed system may make document protection, authentication and security exceptionally simple. Documents are kept secure and private using encryption both at rest and in transfer. Two keys may be required to unlock a document in the vault. With 10-layer, bank-grade security, confidential documents will not be lost, stolen or tampered with. The result is a dramatic reduction of operation costs and a significantly reduced instance of fraud.

The disclosed system can provide a virtual vault, which contains individual critical documents with encrypted document metadata. Owners can permission 3rd party of their choice to view the documents by sending a link with permission code anytime, anywhere. No authenticated document can be lost, stolen or tampered with.

The disclosed system offers real-time verification of a document's owner and issuer, as well as content authentication. It also eliminates the possibility of fraud. All the disclosed system requires may be a simple click of a link or a quick scan of a document presented by a user.

The disclosed system can provide authentication to any signed or personal document, not just those signed online. An owner can roam with his or her virtual vault containing all his/her authentic documents, which can be viewed and verified at anytime and anywhere. Authentication is not limited to the content of the document but includes the identity of the owner and of the issuer. Owner of the documents has full control over whom they give permissions to. Additionally, owners are notified immediately if any documents are being tempered or accessed without their permission before the document is actually being viewed.

The disclosed system is a one that may enable individual consumers, small businesses, companies, enterprises, institutions, governments, and other entities to have the ability to issue original/digital documents in a secure manner to users or another entity. Authenticated individuals who are the designated owner can access these documents from the system vault securely via web or mobile device. Third parties can easily verify a document's authenticity on a third party computer 803 by simply scanning the document's unique/encrypted code or by clicking document link and accessing or viewing the original document with permission of owner's approval all in a few simple clicks and a matter or moments.

While the invention has been described with reference to an exemplary embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. The disclosed embodiments are illustrative, not restrictive.

The invention claimed is:

1. A computer-implemented method for authentication, validation, storage, and third party verification of a user's documents, the computer-implemented method comprising:

authenticating, by a first computer, a user, wherein authentication requires the user to register with a document service using a computer network, and to provide to the document service personal information of the user, in exchange for which the user receives an unauthenticated code, which the user then presents with a photo identification to an ID station associated with the document service which uploads, by the first computer or a second computer, the unauthenticated code and photo identification at the document service and associates them with the user's personal information, the document service then generating a computerized validation code and sending, by the computer network, the validation code to the user for presentation to the ID station, whereby presentation of the validation code to the ID station causes the document service to generate an authenticated user code, the authenticated user code then being sent to the user;

associating a document with the authenticated user code;

transferring, by a third computer, a digital document associated with the authenticated user code from a document source to an electronic vault for the user when requested by the user, wherein the digital document comprises a digital version of the document associated with the authenticated user code;

verifying, by the second computer, the document by receipt of the authenticated user code with the document source, or by independent data;

encrypting and securely storing the digital document so that control of sending or viewing the digital document remains with the user;

storing metadata and encryption data associated with the document at the document service;

having the document service verify the authentication of the digital document in response to a request by a third party and confirm that the digital document is valid, by the user sending, by the network, the authenticated user code to the document service, the document service sending a computerized hyperlink to the third party, and upon the third party clicking on the computerized hyperlink permission is requested from the user for the document service to allow the digital document or metadata for the document to be viewed by the third party, and upon receiving, by the network, permission from the owner, the digital document or metadata is viewable by the third party.

2. The method according to claim 1, wherein the request for verification or viewing of the document or metadata for the document may be from the document owner or from a third party.

3. The method according to claim 1, wherein the document source can be the user or the original creator or issuer of the document.

4. The method according to claim 1, wherein the document source is the original issuer of the document, and the document is validated by verifying with the issuer.

5. The method according to claim 1, wherein the metadata for the document comprises the information that the document exists, is associated with the user, and is currently valid for its intended purpose.

6. The method according to claim 1 wherein the document is an insurance document.

7. The method according to claim 1 wherein the document is government issued identification.

8. The method according to claim 1 wherein the document is an academic transcript.

9. The method according to claim 1 wherein the document is a mortgage document.

10. The method according to claim 1 wherein the document is a mortgage document and the third party is a lending institution.

11. A computer-implemented method for authentication, validation, storage, and third party verification of a user's documents, the computer-implemented method comprising:

authenticating, by a first computer, a user, wherein authentication requires the user to register with a document service using a computer network, and to provide to the document service personal information of the user, in exchange for which the user receives an unauthenticated code, which the user then presents with a photo identification to an ID station associated with the document service which uploads, by the first computer or a second computer, the unauthenticated code and photo identification at the document service and associates them with the user's personal information, the document service then generating a computerized validation code and sending, by the computer network, the validation code to the user for presentation to the ID station, whereby presentation of the validation code to the ID station causes the document service to generate an authenticated user code, the authenticated user code then being sent to the user;

associating a document with the authenticated user code;

transferring, by a third computer, a digital document associated with the authenticated user code from a document source to an electronic vault for the user when requested by the user, wherein the digital document comprises a digital version of the document associated with the authenticated user code;

verifying, by the second computer, the document by receipt of the authenticated user code with the document source, or by independent data;

encrypting and securely storing the digital document so that control of sending or viewing the digital document remains with the user; and storing metadata and encryption data associated with the document at the document service.

12. The method according to claim 11, further comprising a document service receiving a document; encrypting the document with a temporary encryption key; storing hashed metadata; creating a document ID; retrieving a client key; storing the encrypted document with an encryption key and client key; and generating an authenticated user code with hashed metadata.

13. The method according to claim 11, further comprising having the document service verify the authentication of the digital document in response to a request by a third party and confirm that the digital document is valid, wherein the user provides an authenticated document code to the third party, the third party requests verification of a document associated with the authenticated user code, and the document service determines whether the user needs to approve access for the third party to access the digital document.

14. The method according to claim 11, further comprising the document service processing a request for verification of a document, wherein the document service receives a request for verification of a document, the document service looks up the digital document, retrieves the encryption key from a key vault, the document service decrypts the digital document, and checks whether the owner needs to approve third party access to the digital document.

15. The method according to claim 11, wherein the document source can be the user or the original creator or issuer of the document.

16. The method according to claim 11, wherein the metadata for the document comprises the information that the document exists, is associated with the user, and is currently valid for its intended purpose.

17. The method according to claim 11 wherein the document is an insurance document.

18. The method according to claim 11 wherein the document is government issued identification.

19. The method according to claim 11 wherein the document is an academic transcript.

20. The method according to claim 11 wherein the document is a mortgage document.

* * * * *